United States Patent [19]

Lieb

[11] 4,173,365
[45] Nov. 6, 1979

[54] CLAMPING DEVICE FOR TRANSPORTING SPECIMEN PLATES

[75] Inventor: Claude Lieb, Bad Ragaz, Switzerland

[73] Assignee: Balzers Aktiengesellschaft für Hochvakuumtechnik und Dünne Schichten, Liechtenstein

[21] Appl. No.: 910,084

[22] Filed: May 26, 1978

[30] Foreign Application Priority Data

Jun. 1, 1977 [CH] Switzerland ............... 006687/77

[51] Int. Cl.² ............................................ B25J 1/00
[52] U.S. Cl. ................................. 294/19 R; 294/33; 294/99 R; 294/131
[58] Field of Search .............. 294/16, 19 R, 20, 22, 294/27 R, 33, 99 R, 100, 106, 115, 116, 131

[56] References Cited

U.S. PATENT DOCUMENTS

| Re. 16,646 | 5/1927 | Mitchell | 294/116 X |
|---|---|---|---|
| 176,737 | 5/1876 | Campbell | 294/116 X |
| 509,310 | 11/1893 | Heberling | 294/116 X |
| 2,589,642 | 3/1952 | Stueland | 294/99 R X |
| 3,534,993 | 10/1970 | LeVesque | 294/19 R |

Primary Examiner—Johnny D. Cherry
Attorney, Agent, or Firm—McGlew and Tuttle

[57] ABSTRACT

A clamping device for transporting a specimen plate, particularly for an electron microscope specimen comprising, a support plate, a carrier plate disposed in juxtaposed relationship with the support plate having at least two resilient arm poritions and at least a portion of the carrier plate contacting with the support plate, and a claw connected to each resilient arm portion of the carrier plate for engaging the specimen plate therebetween. A rod having a threaded end threaded into one of the support plate and the carrier plate is rotatable in a first direction for moving the carrier plate with respect to the support plate to move each claw away from each other and rotatable in an opposite second direction to move each claw toward each other for engagement of the specimen plate therebetween.

10 Claims, 3 Drawing Figures

CLAMPING DEVICE FOR TRANSPORTING SPECIMEN PLATES

BACKGROUND OF THE INVENTION

1. Field of the Invention

The present invention relates in general to a claw device for transporting specimen plates, particularly those used for electron microscope specimens, and in particular, to a claw device for specimen plates used during the preparation of specimens which are cooled to low temperatures.

2. Description of the Prior Art

In the preparation of cooled electron microscope specimens, it is frequently necessary to transfer objects mounted on a specimen plate from a coolant, for example liquid nitrogen, into a microtome to produce freeze fractures. Alternatively, the specimen plate must be transferred into a vacuum unit for freeze drying and subsequent oblique sputtering. To effect the necessary transfers, a tool is needed which permits a secure engagement of the specimen plate to be transported without imparting any damage to the specimens.

It is known to use grip tongs for transporting specimens, this, however, requires a considerable amount of skill. Also known is a device which is designed as a gripper having holding claws and an actuating mechanism for extending the claws. A disadvantage of the prior device is that it is composed of a plurality of movable individual parts and, therefore, susceptible to trouble. More particularly, the contact pressure of the holding claws on the specimen plate is produced by a compression spring and the safe support of the plate depends on the state of the spring. After long service, for example, the spring may show signs of fatigue or even break completely.

SUMMARY OF THE INVENTION

The present invention is drawn to a claw device for transporting specimen plates which overcomes the prior art difficulties. The clamping device of the invention comprises at least two holding claws which can embrace the rim of specimen plates. The holding claws are connected to resilient arms of a carrier plate which, in one embodiment of the invention, includes a tapped or threaded hole disposed in the carrier plate between the claws. A support plate is positioned in juxtaposed relationship with the carrier plate and is in contact with at least a portion of each resilient arm of the carrier plate. A rod having a threaded end is threaded into the tapped or threaded hole of the carrier plate and is rotatable to move the carrier plate either toward or away from the support plate. The motion of the carrier plate toward and away from the support plate bends the resilient arms and causes the claws connected thereto to move either outwardly away from each other or inwardly toward each other to engage around the rim of a specimen plate. A pin may be provided in the support plate and a bore may be provided in the carrier plate into which the pin is inserted to prevent any relative rotation between the carrier plate and the support plate when the rod is rotated.

In another embodiment of the invention, the support plate includes a threaded bore into which the threaded rod is rotatable. In this embodiment the carrier plate is secured to the support plate near the claws and the threaded rod includes an end which is abuttable against the carrier plate. By rotating the threaded rod in one direction, the carrier plate is moved away from the support plate thus flexing the resilient arm portions of the carrier plate and moving the claws away from each other. The threaded rod can then be rotated in an opposite direction to permit the carrier plate to move toward the support plate through the action of the resilient arm portions and permit the claws to move toward each other thus enabling them to engage with and grasp a specimen plate.

A protective hood may be provided over the support plate and carrier plate of either of the aforementioned embodiments. The protective hood is provided with a gas supply connection for supplying an inert gas or cooling gas to the area of the claws so that a protective environment may be preserved around the specimen plate when the specimen plate is to be clamped and lifted.

Accordingly an object of the present invention is to provide a clamping device for transporting a specimen plate, particularly for an electron microscope specimen comprising, a support plate, a carrier plate disposed in juxtaposed relationship with said support plate having at least two resilient arm portions, a claw connected to each resilient arm portion of said carrier plate and extending away from said support plate for engaging the specimen plate, and a rod having a threaded end threaded into one of said support plate and said carrier plate rotatable in a first direction with respect to said support and carrier plates for moving said carrier plate with respect to said support plate to move each claw away from each other and rotatable in an opposite second direction to move each claw toward each other for engaging the specimen plate therebetween.

A further object of the present invention is to provide a clamping device for transporting a specimen plate which includes a protective hood for providing a protective gas environment in the area of the specimen plate to be transported.

A still further object of the present invention is to provide a clamping device for transporting a specimen plate which is simple in design, rugged in construction and economical to manufacture.

The various features of novelty which characterize the invention are pointed out with particularity in the claims annexed to and forming a part of this disclosure. For a better understanding of the invention, its operating advantages and specific objects arranged by its uses, reference is made to the accompanying drawings and descriptive matter in which preferred embodiments of the invention are illustrated.

DESCRIPTION OF THE PREFERRED EMBODIMENTS

Figures 1, 2, 3:
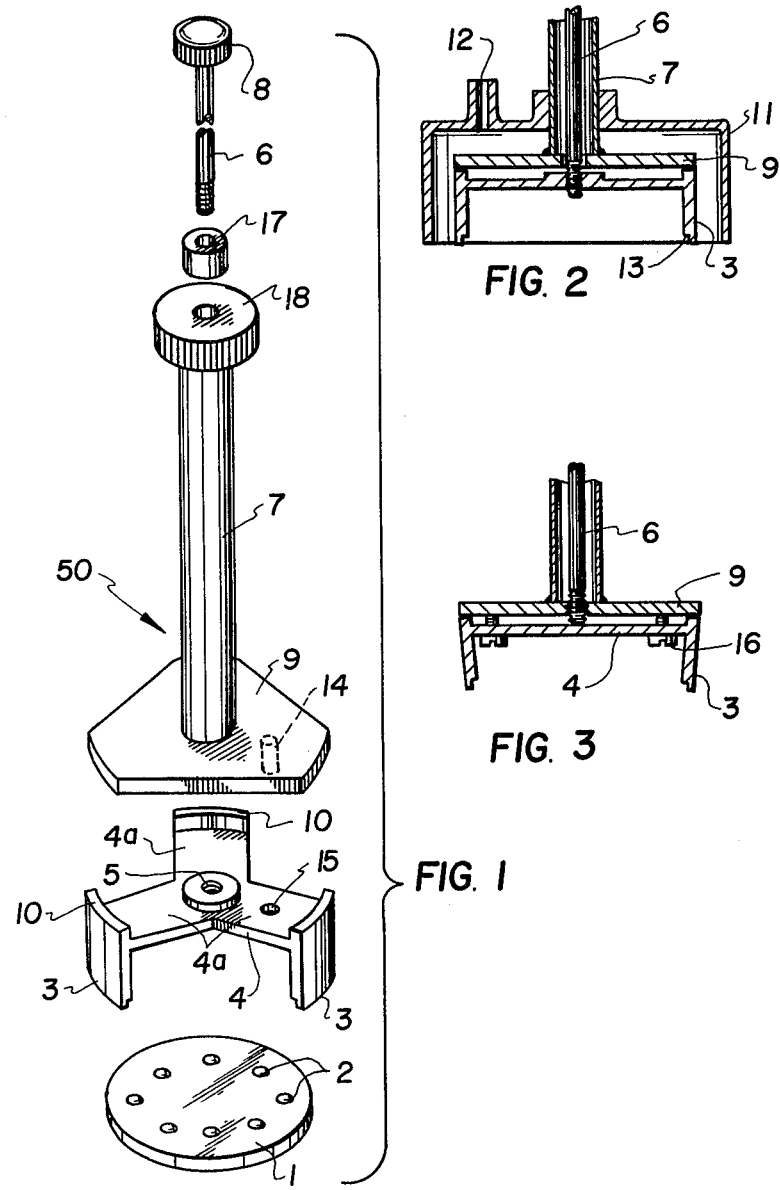
FIG. 1 is a perspective exploded view of one embodiment of the invention.
FIG. 2 is a side elevational cross-sectional view of the embodiment shown in FIG. 1 with the addition of a protective hood.
FIG. 3 is a partial sectional side elevational view of another embodiment of the invention.

Referring now to the drawing in particular, the invention embodied therein in FIG. 1 comprises, a clamping device for transporting a specimen plate generally designated 50 which includes a support plate 9, a carrier plate 4 having resilient arm portions 4a juxtaposed with the support plate 9 and a threaded rod 6 threaded into a tapped hole 5 of the carrier plate 4 for moving the carrier plate 4 in respect to the support plate 9. Each resilient arm portion 4a includes a claw 3 for grasping the rim of a specimen plate 1.

In accordance with the invention, the specimen plate 1 supporting electron microscope specimens 2 secured thereto, is to be transported. Claws 3 provided on the peripheral edges of the three-armed carrier plate 4 serve the purpose of gripping the specimen plate 1. In the assembled state of the device, the carrier plate 4, which is designed as a claw star, is supported by the threaded rod 6 which extends through a hollow handle 7 connected to the support plate 9. Threaded rod 6 is guided in hollow handle 7, which may be formed by a thin-walled steel tube, and provided with a control knob 8 on its upper end. The supporting plate 9 is secured to the lower end of handle 7 and corresponds in size and shape to the claw star 4 as shown in FIG. 1. Claws 3 are provided with extensions 10 which, upon screwing threaded rod 6 into tapped hole 5, are pressed against supporting plate 9.

The lower part of the device in the embodiment of FIG. 1 is shown in FIG. 2 in its assembled state. Corresponding parts are designated by identical reference numerals. FIG. 2 shows a protective hood 11 enclosing the entire assembly and provided with a gas supply connection 12.

To better grip the specimen plate, claws 3 are advantageously each provided with a step 13 on the inside of their lower edge, which applies against the rim of the plate to be transported.

The size of carrier plate 4 with its resilient arm portions 4a is chosen so that the claws 3 with their recesses 13 just surround the specimen plate 1 without engaging it. Carrier plate 4 can be brought into its unclamped state by rotating threaded rod 6 in a first direction to permit carrier plate 4 to move away from support plate 9 and, through the resiliency of resilient arm portions 4a, permit the claws 3 to move apart from each other. The rotation of threaded arm 6 is effected by grasping and rotating control knob 8 and the assembly including the hollow handle 7 and support plate 9 can be held in a stationary position by grasping a support knob 18.

To engage the specimen plate 1, threaded rod 6 is rotated in an opposite second direction which pulls carrier plate 4 upwardly toward the support plate 9. To effect this upward displacement of carrier plate 4, a spacer sleeve 17 is positioned between the control knob 8 and the support knob 18 to act as a reaction member to enable threaded rod 6 to lift carrier plate 4 in the area of threaded hole 5. This lifting of carrier plate 4 in the area of threaded hole 5 distorts the resilient arm portions 4a and pulls claws 3 together which thereby engage around the rim of specimen plate 1.

The protective hood of FIG. 2 may be provided when sensitive specimens are to be transported which cannot stand exposure to the atmosphere. A suitable protective or inert gas can be supplied through the gas supply connection 12 during this transportation to provide a protective atmosphere.

To avoid an inconvenient rotation of the claw star during the manipulation, a pin 14 may be provided on supporting plate 9, engaging a bore 15 in carrier plate 4, so that an axial displacement of the two parts relative to each other is possible but a rotary motion is prevented.

FIG. 3 shows another embodiment of the invention in which in the non-clamped state of carrier plate 4, claws 3 are inclined slightly inwardly, while the plate 4 is suspended from and connected to supporting plate 9 by means of screws 16. If now carrier plate 4 is pushed away from supporting plate 9 by means of the threaded rod, the claws open, i.e. are moved slightly outwardly. In this open state, they can engage a specimen plate, whereupon the claws apply tightly and the plate can be transported.

While specific embodiments of the invention have been shown and described in detail to illustrate the application of the principles of the invention, it will be understood that the invention may be embodied otherwise without departing from such principles.

What is claimed is:

1. A clamping device for transporting a specimen plate, particularly for an electron microscope specimen comprising, a support plate, a carrier plate disposed in juxtaposed relationship with said support plate having at least two resilient arm portions, a claw connected to each resilient arm portion of said carrier plate extending away from said support plate for engaging the specimen plate, and a threaded rod having a threaded end threaded into one of said support plate and said carrier plate and being rotatable in a first direction with respect to said support and carrier plates for moving said carrier plate with respect to said support plate to move each claw away from each other and rotatable in a second opposite direction to move each claw toward each other for engaging the specimen plate therebetween.

2. A clamping device according to claim 1, wherein each claw includes an extension portion extending toward and connecting with said support plate.

3. A clamping device according to claim 1, further including a hollow handle connected to said support plate, said carrier plate including a central threaded hole, said threaded rod being rotatable in said hollow handle and threaded to said threaded hole of said carrier plate, and a reaction body disposed between said thread rod and said hollow handle.

4. A clamping device according to claim 3, wherein said threaded rod includes a control knob and said reaction body comprises a spacer collar between said control knob and said hollow handle.

5. A clamping device according to claim 1, wherein said carrier plate with its resilient arm portions comprises a three armed star.

6. A clamping device according to claim 1, further including a protective hood partially surrounding said support plate and said carrier plate with its claws, said protective hood including a gas supply connection for supplying a protective gas to said protective hood.

7. A clamping device according to claim 1, wherein said threaded rod is threaded into said support plate and has an end abutting against said carrier plate, and said carrier plate is connected to said support plate at locations spaced from the abutment between said threaded rod end and said carrier plate.

8. A clamping device for transporting a specimen slide, particularly for an electron microscope specimen comprising, a support plate, a carrier plate having three resilient arm portions spaced from and facing said support plate, a claw connected to the end of each resilient arm portion extending away from said support plate and having an extension extending toward and touching said support plate, a hollow handle connected to said support plate extending away from said carrier plate, said carrier plate including a central tapped hole, a threaded rod having a control knob rotatable within said hollow handle and threaded into said threaded hole of said carrier plate, and a spacer collar disposed around said threaded rod between said control knob and said threaded rod and said hollow handle.

9. A clamping device according to claim 8, wherein each claw includes a step for engagement with a specimen plate.

10. A clamping device according to claim 8, further including a pin connected to said support plate and at least one of said resilient arm portions including a bore, said pin extending through said bore for preventing a rotation between said support plate and said carrier plate.

* * * * *